US012108025B2

(12) United States Patent
Moheghi et al.

(10) Patent No.: US 12,108,025 B2
(45) Date of Patent: Oct. 1, 2024

(54) EYE-TRACKING OPTICAL VERIFICATION TESTER

(71) Applicant: Meta Platforms Technologies, LLC, Menlo Park, CA (US)

(72) Inventors: Alireza Moheghi, Bothell, WA (US); Peter Jasinski, Redmond, WA (US); Justin Grimes, Kenmore, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 245 days.

(21) Appl. No.: 17/709,423

(22) Filed: Mar. 31, 2022

(65) Prior Publication Data

US 2023/0199167 A1 Jun. 22, 2023

Related U.S. Application Data

(60) Provisional application No. 63/292,583, filed on Dec. 22, 2021.

(51) Int. Cl.
| | | |
|---|---|---|
| *H04N 17/00* | (2006.01) | |
| *F25B 21/02* | (2006.01) | |
| *G01M 11/00* | (2006.01) | |
| *G01M 11/08* | (2006.01) | |
| *H04N 23/52* | (2023.01) | |

(Continued)

(52) U.S. Cl.
CPC ........... *H04N 17/002* (2013.01); *F25B 21/02* (2013.01); *G01M 11/00* (2013.01); *G01M 11/081* (2013.01); *H04N 23/52* (2023.01); *H04N 23/56* (2023.01); *H04N 23/695* (2023.01)

(58) Field of Classification Search
CPC ...... H04N 17/002; H04N 23/52; H04N 23/56; H04N 23/695; H04N 23/74; F25B 21/02; G01M 11/00; G01M 11/081; G01M 11/0207; G06F 3/013; G02B 27/0093
See application file for complete search history.

(56) References Cited

U.S. PATENT DOCUMENTS

| | | |
|---|---|---|
| 7,538,800 B1 | 5/2009 | Caretti et al. |
| 9,672,702 B2 | 6/2017 | Coish et al. |
| | (Continued) | |

FOREIGN PATENT DOCUMENTS

| | | | |
|---|---|---|---|
| FR | 2974904 A1 * | 11/2012 | ............ G01M 11/02 |

OTHER PUBLICATIONS

English Translation of Berger et al. (FR-2974904-A1) Description (Year: 2012).*
Dain S.J., et al., "Assessment of Fogging Resistance of Antifog Personal Eye Protection," Ophthalmic and Physiological Optics, Jul. 1, 1999, vol. 19, No. 04, pp. 357-361.
International Search Report and Written Opinion for International Application No. PCT/US2022/053573, mailed May 9, 2023, 11 pages.

(Continued)

*Primary Examiner* — Dominic J Bologna
*Assistant Examiner* — Akbar H. Rizvi
(74) *Attorney, Agent, or Firm* — Freestone Intellectual Property Law PLLC; Aaron J. Visbeek

(57) ABSTRACT

An apparatus, system, and method for an eye-tracking optical verification tester are described herein. In some aspects, a heating element such as a Peltier or Thermoelectric Cooler "TEC" includes a see-through void and may be used to control a temperature of an eye-tracking optical element. An environmental enclosure that is configured to assist in simulation of an environmental condition may hold the eye-tracking optical element. The eye-tracking optical element is to receive reflected light from an eye-tracking target and direct the reflected light to an eye-tracking camera.

20 Claims, 5 Drawing Sheets

(51) Int. Cl.
*H04N 23/56* (2023.01)
*H04N 23/695* (2023.01)

(56) References Cited

U.S. PATENT DOCUMENTS

| | | | |
|---|---|---|---|
| 10,533,780 | B2 | 1/2020 | Yi et al. |
| 10,704,984 | B2 | 7/2020 | Kang et al. |
| 10,725,302 | B1 | 7/2020 | Sharma et al. |
| 11,085,879 | B1 * | 8/2021 | Ziegler ............... G01N 21/958 |
| 2007/0188407 | A1 | 8/2007 | Nishi |
| 2011/0116170 | A1 | 5/2011 | Smith et al. |
| 2016/0353094 | A1 | 12/2016 | Rougeaux |
| 2017/0177085 | A1 * | 6/2017 | Sun ........................ G06F 3/012 |
| 2019/0163267 | A1 * | 5/2019 | Hainzl ................. G02B 27/017 |
| 2019/0302443 | A1 | 10/2019 | Garrison et al. |
| 2020/0093361 | A1 * | 3/2020 | Jackson ............... A61B 3/0075 |
| 2020/0239823 | A1 | 7/2020 | Tanabe et al. |
| 2021/0063685 | A1 * | 3/2021 | Ahmadi ................ G02B 7/008 |
| 2021/0266474 | A1 * | 8/2021 | Sharma ............. G02B 27/0093 |
| 2022/0171332 | A1 | 6/2022 | Cuche et al. |

OTHER PUBLICATIONS

Margrain T.H., et al., "The Misting Characteristics of Spectacle Lenses," Ophthalmic and Physiological Optics, Mar. 1996, vol. 16, No. 02, pp. 108-112.
Parida K., et al., "Emerging Thermal Technology Enabled Augmented Reality," Advanced Functional Materials, 2021, vol. 31, 27 pages.
Peiris R.L., et al., "ThermoVR: Exploring Integrated Thermal Haptic Feedback with Head Mounted Displays," Virtual Reality, CHI 2017, May 2017, pp. 5452-5456.
Wolf D., et al., "Face/On: Multi-Modal Haptic Feedback for Head-Mounted Displays in Virtual Reality," IEEE Transactions on Visualization and Computer Graphics, Aug. 2019, 10 pages.
Dominguez M.Z., et al., "Software Configurable Optical Test System for Refractive Optics," 22nd Congress of the International Commission for Optics: Light for the Development of the World, Nov. 2, 2011, 6 pages.
Non-Final Office Action mailed Feb. 28, 2024 for U.S. Appl. No. 17/709,429, filed Mar. 31, 2022, 17 pages.
Co-pending U.S. Appl. No. 17/709,429 inventors Alireza Moheghi et al., filed on Mar. 31, 2022.

* cited by examiner

EYE-TRACKING OPTICAL VERIFICATION TESTER

CROSS-REFERENCE TO RELATED APPLICATION

The present Application claims the benefit of U.S. Provisional Application No. 63/292,583, entitled "In situ Eye-Tracking Optical Verification Tester" filed Dec. 22, 2021. U.S. Provisional Application No. 63/292,583 is expressly incorporated herein by reference in its entirety.

TECHNICAL FIELD

Aspects of the present disclosure relate generally to the testing of optical components, and in particular, but not exclusively to testing of eye-tracking optical components.

BACKGROUND

A thermoelectric cooler (TEC), e.g., a Peltier cooler, operates according to the Peltier effect. The Peltier effect occurs when current is passed through a junction between two materials made of dissimilar conductors, creating a temperature differential. Arrangements of semiconductors may form a Peltier device which serve as a solid-state heat pump for heating, cooling, or control of temperature.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Figure 1:
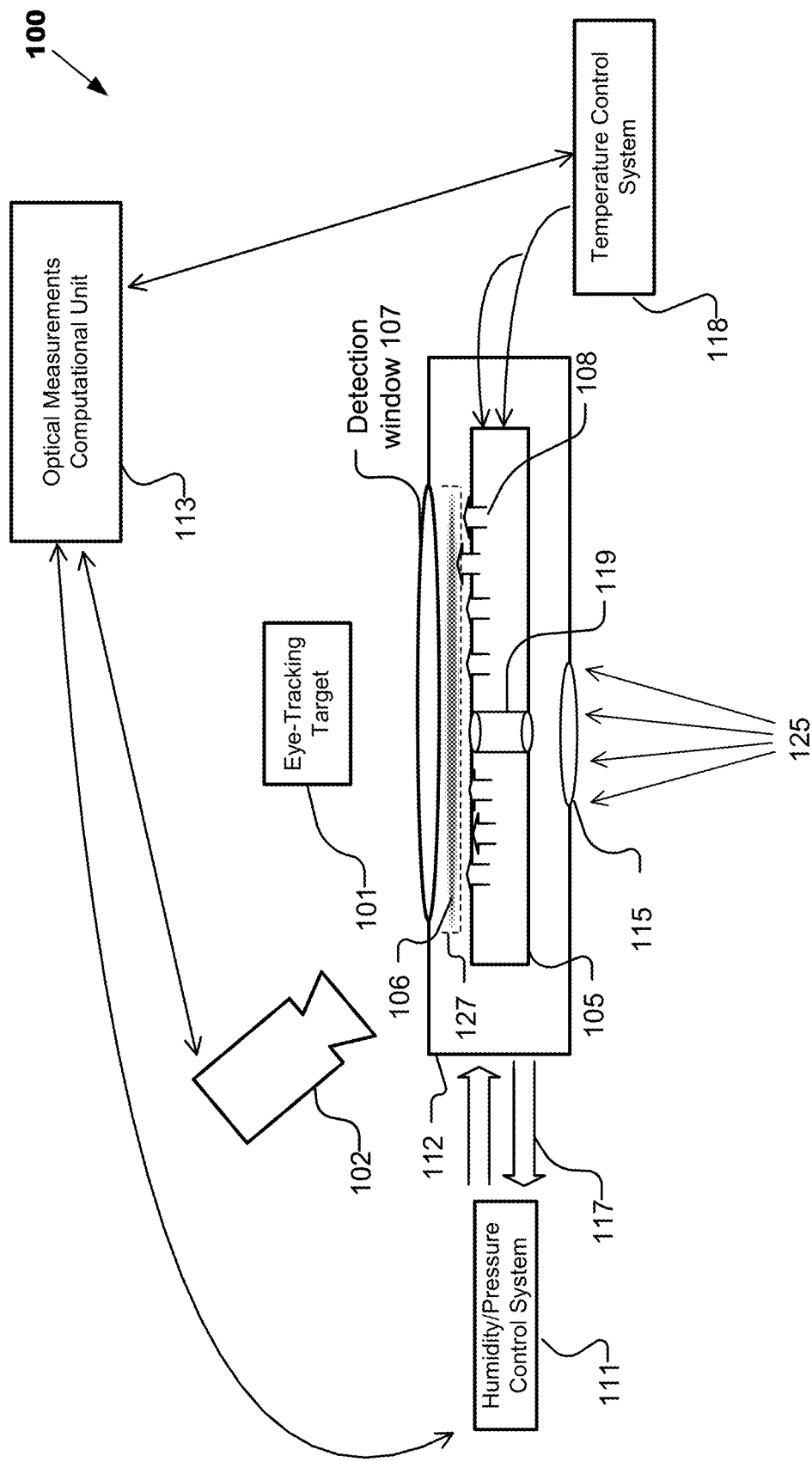
FIG. 1 illustrates an eye-tracking optical verification tester, in accordance with aspects of the present disclosure.

Embodiments of an eye-tracking optical verification tester are described herein. In some aspects, a heating element such as a Peltier or Thermoelectric Cooler "TEC" may be used to control a temperature of an eye-tracking optical element. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

Optical components may be implemented in products that are exposed to a wide variety of environmental conditions, from moderate indoor conditions to extreme outdoor conditions. The functionality of the optical components may vary under such conditions. Accordingly, testing the optical components under a wide range of temperature, pressure, and humidity conditions is desired. Due to environmental chamber sizes and other limitations, however, adequate testing can be a challenge. Current testing solutions may not exist or are not suitable for testing optical components, in particular, see-through optical components.

Accordingly, in implementations of the disclosure, a heating element such as a Peltier or Thermoelectric Cooler "TEC" may be used to control a temperature of an eye-tracking optical element. In aspects, the heating element includes a see-through hole or void configured to allow pass-through light to propagate through the eye-tracking optical element to an eye-tracking target. In embodiments, a mechanical stage may hold and move the eye-tracking optical element with respect to the heating element to facilitate optical test measurements.

In embodiments, the described eye-tracking optical verification tester offers compact gas-tight and/or vacuum-tight capability for optical see-through and reflective tests of eye-tracking optical components or elements. In aspects, an environmental enclosure includes the heating element and the eye-tracking optical element under test. In some examples, eye-tracking optical components for head mounted devices such as augmented reality (AR) head mounted displays may be tested using the system.

FIG. 1 illustrates an eye-tracking optical verification tester or testing system 100 to assist in controlling an environmental condition for testing of an eye-tracking optical element, according to aspects of the disclosure. As shown, in FIG. 1, eye-tracking optical verification testing system 100 ("testing system 100") includes an eye-tracking target 101, an eye-tracking camera 102, and an environmental enclosure 112. In embodiments, environmental enclosure 112 includes an eye-tracking optical element 106 proximal to a heating element 105. In aspects, a mechanical stage (represented by dotted lines 127) that holds or is coupled to eye-tracking optical element 106 is also included in environmental enclosure 112. In embodiments, optical verification testing system 100 may control temperature, humidity, and pressure of an environment simulated in environmental enclosure 112. In embodiments, the configuration allows eye-tracking camera 102 which collects test data to be separate from and/or independent of a simulated environmental condition.

In aspects, heating element 105 may be a Peltier which can vary temperature on a surface of eye-tracking optical element 106. In embodiments, eye-tracking optical element 106 may be in contact with or in close proximity to heating element 105 such that eye-tracking optical element 106 accepts heat (e.g., 108) generated by heating element 105. In aspects, a temperature control system 118 may adjust an electrical current driven through the Peltier or heating element 105 to adjust the temperature. In embodiments, heating element 105 has a see-through void 119.

Please replace of the Specification with the following amended paragraph: Environmental enclosure 112 includes an entrance path window 115 and a detection window 107 disposed on opposite sides of environmental enclosure 112 to allow pass-through light through see-through void 119. Accordingly, pass-through light from an illumination source 125 can transmit light through heating element 105 and through eye-tracking optical element 106 to illuminate eye-tracking target 101. In embodiments, eye-tracking target 101 may be a pattern or other visual target. Note that see-through void 119 may have a dimension (e.g., a diameter) of approximately 1 cm, in some implementations. In other implementations, the dimensions may vary according to various factors, e.g., size of an optical component or element being tested. Note also that proportional sizes of entrance path window 115 to detection window 107 are merely illustrative and any suitable size relative to see-through void 119 that facilitates transmission of pass-through light for testing purposes may be contemplated.

As shown, in FIG. 1, in aspects, an optical measurements computational unit 113 is coupled to send and receive signals from humidity-pressure control system 111, eye-tracking camera 102, temperature control system 118, and illumination source 125. Note that testing system 100 can perform optical verification tests with or without one or more of illumination source 125, detection window 107, and/or entrance path window 115. Accordingly, although shown in FIG. 1, in various other embodiments, testing system 100 may not include one or more of illumination source 125, detection window 107, and/or entrance path window 115.

Temperature control system 118 and humidity-pressure control system 111 may be configured to adjust temperature and humidity or pressure in the environmental enclosure. In embodiments, environmental enclosure 112 is configured to receive humidity and atmospheric pressure inputs from humidity-pressure control system 111 via gas exchange tubes 117. In the example, environmental enclosure 112 is vacuumed-sealed.

In embodiments, conditions in environmental enclosure 112 may be controlled between −10 C to 40 C. In various examples, humidity may be controlled between 0% to 70% and various atmospheric pressures may be controlled so that the eye-tracking optical element 106 is tested under a variety of environmental contexts or conditions. The optical tests of the eye-tracking optical element or other optical elements may include transmission, haze, signal to noise ratio (SNR), contrast to noise ratio (CNR), and/or modulation transfer function (MTF) optical tests.

Figure 2:
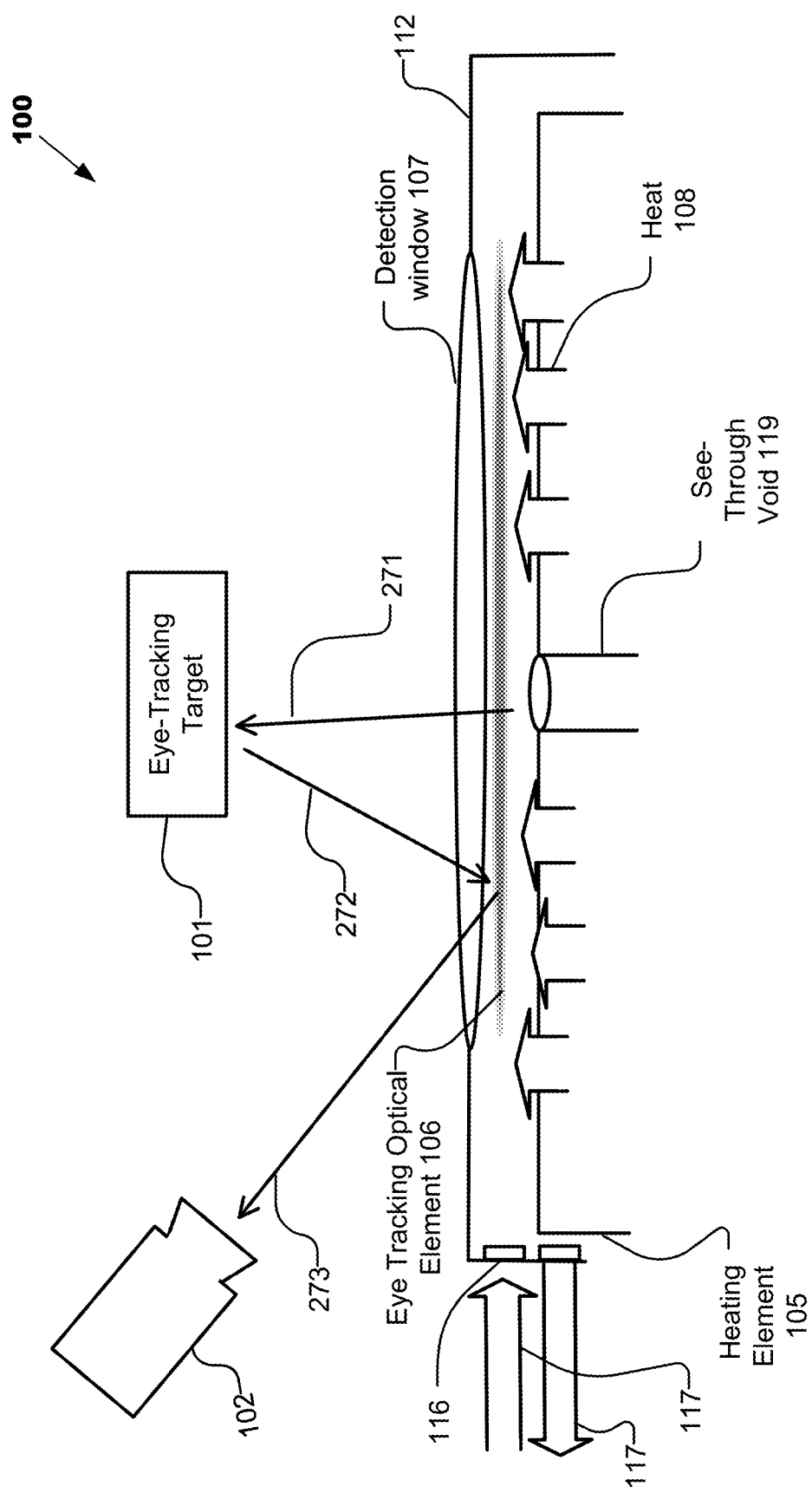
FIG. 2 illustrates a close-up view of a portion of the eye-tracking optical verification tester of FIG. 1, in accordance with aspects of the present disclosure.

FIG. 2 illustrates a close-up view of a portion of the eye-tracking optical verification tester 100 of FIG. 1, in accordance with aspects of the present disclosure. As noted above, in embodiments, environmental enclosure 112 is configured to control humidity and atmospheric pressure within environmental enclosure 112. Note that environmental enclosure 112 includes a humidity-pressure input port 116 through which to receive humidity or pressure inputs from humidity-pressure control system 111 via gas exchange tubes 117.

As shown in FIG. 2, illumination light 271 passes through eye-tracking optical element 106 to illuminate eye-tracking target 101. In aspects, illumination light 271 may be infrared illumination light emitted by illuminators (e.g., light emitting diodes (LEDs) or vertical cavity surface emitting lasers (VCSELs) included in eye-tracking optical element 106). In the example, illumination light 271 is reflected/dispersed by eye-tracking target 101 as reflected light 272. In aspects, eye-tracking optical element 106 is configured to receive and direct reflected light 272 from eye-tracking target 101 to direct newly reflected light 273 towards eye-tracking camera 102 so that eye-tracking camera 102 can capture an eye-tracking image.

Figure 3:
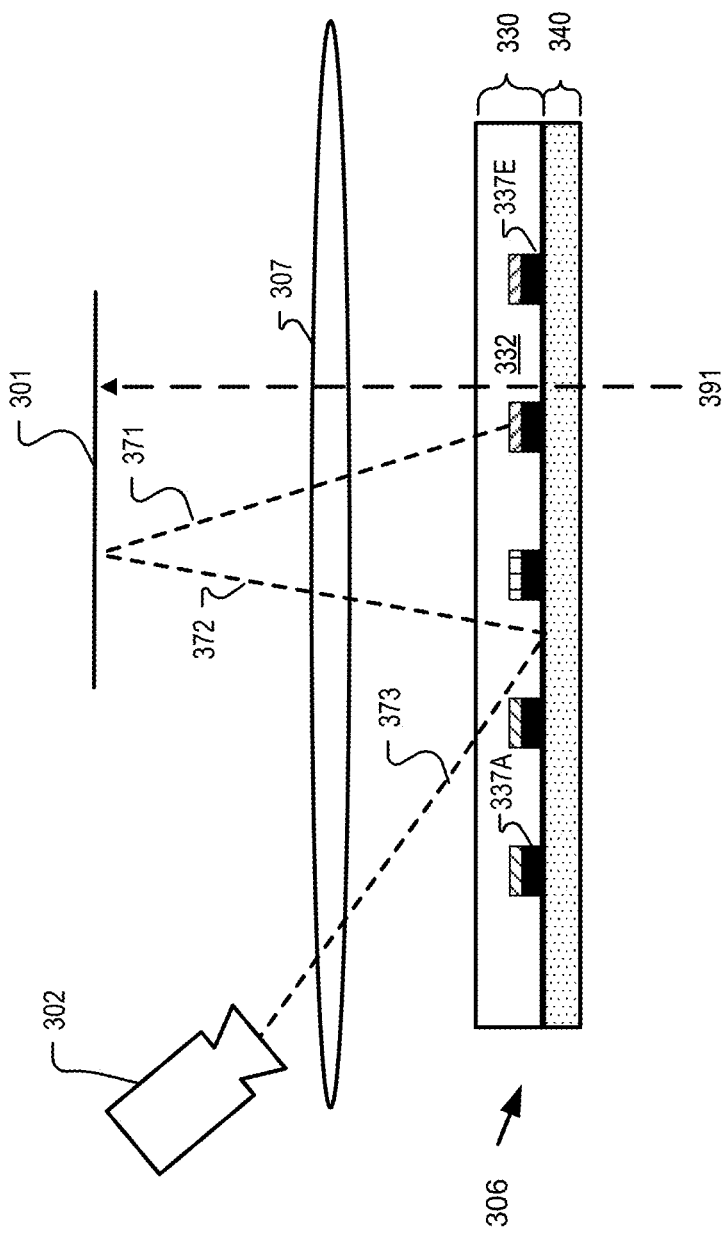
FIG. 3 illustrates an example eye-tracking optical element, in accordance with aspects of the present disclosure.

FIG. 3 illustrates an example of an eye-tracking optical element 306 including an illumination layer 330 and an optical combiner layer 340. In aspects, eye-tracking optical element 306 may be similar or the same as eye-tracking optical element 106 of FIGS. 1 and 2. In some embodiments, eye-tracking optical element 306 is a near-eye eye-tracking optical element. In the example, eye-tracking optical element 306 passes at least a portion of pass-through light 391 to illuminate the eye-tracking target 301 (similar or same as eye-tracking target 101 of FIG. 1 and FIG. 2). In aspects, pass-through light 391 is pass-through light which originates from an illumination source and may propagate through detection window 307 (e.g., also 107 of FIGS. 1 and 2) to illuminate the eye-tracking target 301. In aspects, the pass-through light 391 may be visible light. Note that an optical path of the pass-through light 391 runs through an entrance path window (e.g., 115 of FIG. 1), the see-through void (e.g., 119 of FIG. 1), eye-tracking optical element 306 and the detection window 307 (also, e.g., 107 of FIG. 1), in that order, prior to encountering eye-tracking target 301.

In the example of FIG. 3, illumination layer 330 includes illuminators 337A-337E, which may be, e.g., infrared LEDs or VCSELs. In embodiments, illumination layer 330 may include a transparent encapsulant 332. In an example, during operation, the illuminators 337 emit infrared illumination light 371 to illuminate the eye-tracking target 301. The reflected light 372 is the infrared illumination light 371 reflecting off the eye-tracking target 301. The reflected light becomes incident on optical combiner layer 340 that directs the newly reflected light 373 to the eye-tracking camera 302 so that the eye-tracking camera 302 can capture image data, e.g., an eye-tracking image of eye-tracking target 301. In various examples, optical combiner layer 340 may include a volume hologram or other diffractive structure to direct the newly reflected light 373 to eye-tracking camera 302. In various embodiments, eye-tracking target 301 may be a pattern such as a checkerboard pattern of other suitable pattern for analyzing images. Note that although FIG. 3 only illustrates one illuminator 337 emitting the infrared illumination light 371, plurality of illuminators 337 (e.g., a 5×5 two-dimensional array) may also illuminate eye-tracking target 301 with infrared illumination light.

In aspects, see-through void 119 allows for optical measurements that include pass-through light 391 from illumination light from illumination source (e.g., 125 of FIG. 1). This configuration may allow for characterization of the eye-tracking optical element being tested where pass-through light 391 illuminates eye-tracking target 301 and also passes through the eye-tracking optical element (e.g., 106). Consequently, an optical test algorithm covering variation of temperature, humidity and pressure may be used to verify optical performance.

Figure 4:
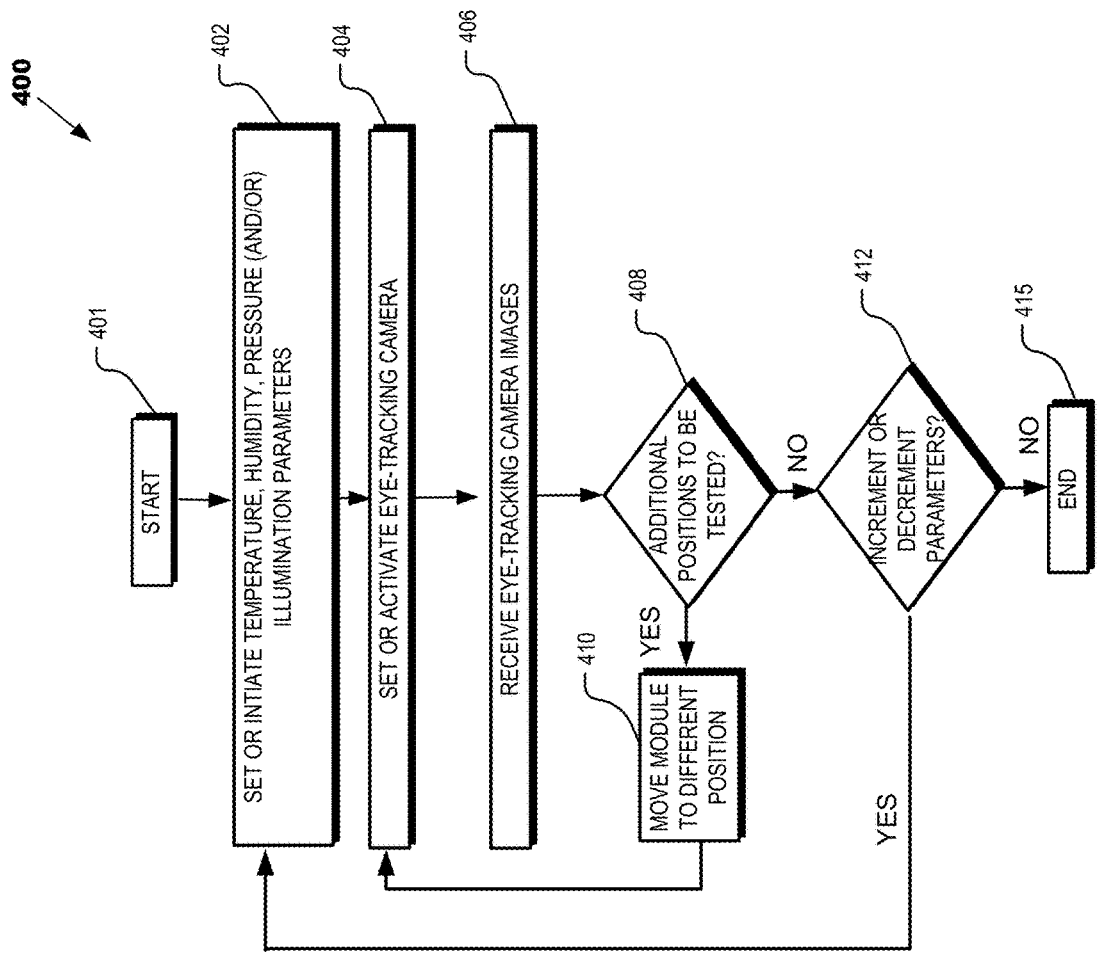
FIG. 4 is a flow chart that illustrates an example process for the eye-tracking optical verification tester, in accordance with aspects of the present disclosure.

FIG. 4 is a flow chart that illustrates an example process 400 for the eye-tracking optical verification tester of FIGS.

1 and 2, in accordance with aspects of the present disclosure. Process 400 is one example process performed by an optical measurement processing logic or optical measurements computational unit 113 of FIG. 1 which may be included in computing device 502 of FIG. 5. Process 400 may be described with additional reference to elements of FIGS. 1 and 2.

In embodiments, after start block 401, at process block 402, a computing device (e.g., 502) sets and/or initiates temperature, humidity, pressure (and/or illumination) parameters. For example, the computing device may send temperature commands to a temperature control system 118 and/or humidity/pressure commands to humidity-pressure control system 111. In the example, temperature control system 118 is configured to adjust the heating element 105 in response to receiving the temperature commands. The humidity-pressure control system 111 is configured to adjust the humidity or pressure of the environmental enclosure in response to receiving the humidity or pressure commands. In some embodiments, the computing device, e.g., 502, may also set and/or initiate illumination parameters, e.g., intensity, for illumination source 125.

In next process block 404, the computing device may set or activate eye-tracking camera 102. After eye-tracking camera 102 has taken images, the computing device may receive image data, e.g., eye-tracking images from eye-tracking camera 102 at a process block 406. In aspects, at a next process block 408, computing device 502 determines whether testing is to be conducted at an additional position of the eye-tracking optical element 106 (or "module"). If YES, flow moves to block 410 where the computing device may drive a mechanical stage to position the module in a different lateral position with respect to heating element 105 and with respect to see-through void 119.

Thus, flow then returns to block 404 where process 400 or computing device 502 begins again to initiate an optical measurement with eye-tracking camera 102 as the eye-tracking optical element 106 arrives at a different lateral position. In aspects, process 400 may loop through process blocks 404-410 until there are no additional positions to be tested at the current parameters. At that point, the answer at decision block 408 is NO, and flow moves to decision block 412 where it is determined whether the temperature, humidity, or pressure parameters (or illumination) should be incremented or decremented. If the answer is YES then flow returns to block 402, where the parameters are changed/set to different parameters. In aspects, the flow then loops through process blocks 402 through 412 until the answer is NO at block 412. The process 400 then may end at block 415.

It is understood that process 400 is merely a simplified example of a process that may be associated with the optical verification tester of FIGS. 1 and 2. Note that additional (or fewer) process blocks may be included in process 400. Furthermore, the order in which some or all of the process blocks appear in process 400 should not be deemed limiting. Rather, one of ordinary skill in the art having the benefit of the present disclosure will understand that some of the process blocks may be executed in a variety of orders not illustrated.

Figure 5:
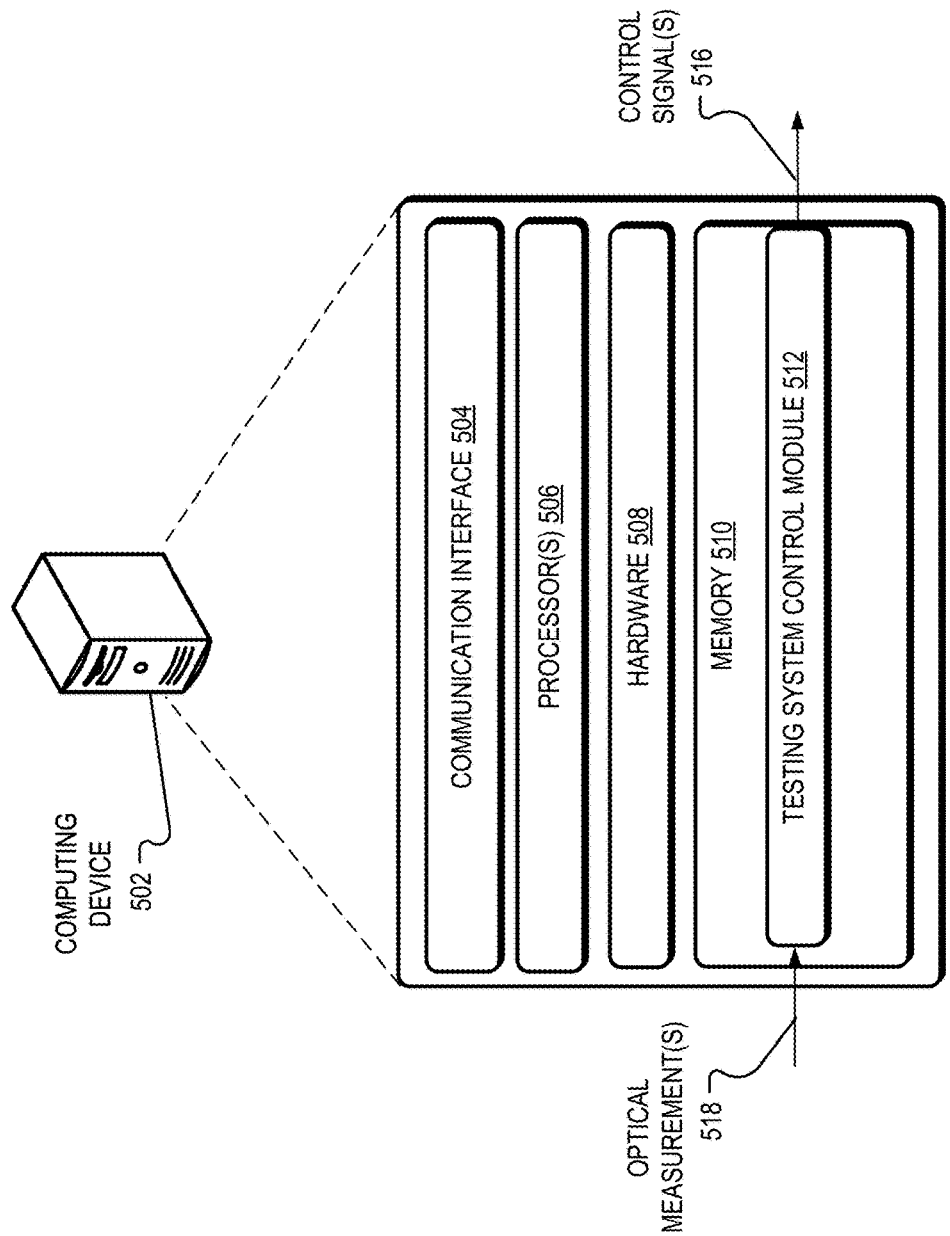
FIG. 5 illustrates an example computing device for the eye-tracking optical verification tester, in accordance with aspects of the present disclosure.

FIG. 5 illustrates an example computing device 502 for the eye-tracking optical verification tester or testing system 100 of FIGS. 1 and 2, in accordance with aspects of the present disclosure. As noted above, computing device 502 is one possible implementation of the optical measurements computational unit 113. The illustrated example of computing device 502 is shown as including a communication interface 504, one or more processors 506, hardware 508, and a memory 510.

The communication interface 504 may include wireless and/or wired communication components that enable the computing device 502 to transmit data to and receive data from other networked devices including, e.g., humidity-pressure control system 111, eye-tracking camera 102, and temperature control system 118 of FIG. 1. The hardware 508 may include additional hardware interface, data communication, or data storage hardware. For example, the hardware interfaces may include a data output device (e.g., electronic display, audio speakers), and one or more data input devices.

The memory 510 may be implemented using non-transitory computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 506 and the memory 510 of the computing device 502 may implement testing system control module 512, e.g., optical measurements computational unit 113. The testing system control module 512 may include routines, program instructions, objects, and/or data structures that perform particular tasks or implement particular abstract data types. The memory 510 may also include a data store (not shown) that is used by the testing system control module 512.

The testing system control module 512 may be configured to receive eye-tracking image and/or optical measurements 518 (e.g., from eye-tracking camera 102) and may generate one or more control signals 516 to perform one or more of the processes described in connection with flow chart 400 of FIG. 4. The processors 506 and the memory 510 of the computing device 502 may implement additional modules that are not explicitly illustrated in FIG. 5.

Embodiments of the invention may be utilized for, e.g., testing of optical elements for an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

Accordingly, an optical verification testing system has been described herein including an eye-tracking target, an eye-tracking camera, an illumination source configured to emit pass-through light towards the eye-tracking target, and an environmental enclosure configured to control humidity and atmospheric pressure within the environmental enclosure. In aspects, the environmental enclosure is configured to hold an eye-tracking optical element configured to receive reflected light from the eye-tracking target and direct the reflected light to the eye-tracking camera, and a heating element configured to provide heat to the eye-tracking optical element to assist in simulation of an environmental condition including to control a temperature of the eye-tracking optical element.

In embodiments, an environmental enclosure includes a humidity-pressure input port and is configured to receive humidity or pressure input from the humidity-pressure input port for changing the humidity or atmospheric pressure within the environmental enclosure. The environmental enclosure includes a heating element including a see-through void, a mechanical stage configured to hold an eye-tracking optical element to receive heat from the heating element and configured to move the eye-tracking optical element with respect to the see-through void of the heating element. The environmental enclosure also includes a detection window is configured to allow reflection light reflecting off of an eye-tracking target to become incident on the eye-tracking optical element and configured to allow the eye-tracking optical element to redirect the reflection light to an eye-tracking camera to capture an eye-tracking image.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system comprising:
 a heating element; and
 an environmental enclosure surrounding the heating element, wherein the heating element is configured to provide heat to an eye-tracking optical element to assist in performance of a test of the eye-tracking optical element under an environmental condition simulated in the environmental enclosure, wherein the heating element includes a see-through void that includes a hole in the heating element to allow pass-through light to propagate through the eye-tracking optical element for capture of image data by an eye-tracking camera for the test under the environmental condition.

2. The system of claim 1, wherein the heating element is configured to allow the pass-through light to propagate through the eye-tracking optical element and become incident onto an eye-tracking target, and the eye-tracking optical element is configured to receive reflected light from the eye-tracking target and direct the reflected light to the eye-tracking camera.

3. The system of claim 1, wherein the environmental enclosure includes an entrance path window and a detection window disposed on opposite sides of the environmental enclosure, and wherein an optical path of the pass-through light runs through the entrance path window, the see-through void in the heating element, and the detection window, in that order, prior to encountering an eye-tracking target.

4. The system of claim 1, further comprising an illumination source to emit pass-through light, and wherein the eye-tracking optical element is configured to pass at least a portion of the pass-through light to an eye-tracking target.

5. The system of claim 1, further comprising the eye-tracking camera and wherein the eye-tracking camera is configured to capture an eye-tracking image of an eye-tracking target in response to reflected light directed to the eye-tracking camera by the eye-tracking optical element.

6. The system of claim 1, wherein the heating element includes a Peltier.

7. The system of claim 1, wherein the environmental enclosure is configured to control humidity and atmospheric pressure within the environmental enclosure to assist in simulating the environmental condition.

8. The system of claim 1, wherein the eye-tracking optical element to be tested includes an illumination layer and a combiner layer, and wherein the illumination layer emits infrared illumination light to illuminate an eye-tracking target, the reflected light being the infrared illumination light reflecting off of the eye-tracking target.

9. The system of claim 1, wherein the pass-through light is visible light.

10. The system of claim 1 further comprising:
optical measurement processing logic; and
a mechanical stage configured to hold the eye-tracking optical element and configured to move the eye-tracking optical element with respect to the see-through void in the heating element, wherein the optical measurement processing logic is configured to:
drive the mechanical stage to position the eye-tracking optical element in different lateral positions with respect to the heating element; and
initiate an optical measurement with the eye-tracking camera as the eye-tracking optical element arrives at the different lateral positions.

11. The system of claim 10 further comprising:
a temperature control system configured to receive temperature commands from the optical measurement processing logic, and wherein the temperature control system is configured to adjust the heating element in response to receiving the temperature commands from the optical measurement processing logic.

12. The system of claim 10 further comprising:
a humidity-pressure control system configured to receive humidity commands and pressure commands from the optical measurement processing logic, and wherein the humidity-pressure control system is configured to adjust humidity or pressure of the environmental enclosure in response to receiving the humidity commands or pressure commands, respectively.

13. The system of claim 12 further comprising:
gas exchange tubes coupled between the humidity-pressure control system and the environmental enclosure, wherein the environmental enclosure is configured to receive humidity and atmospheric pressure inputs from the humidity-pressure control system via the gas exchange tubes.

14. The system of claim 1, wherein the environmental enclosure is vacuumed-sealed.

15. The system of claim 1, wherein the eye-tracking camera is outside of the environmental enclosure.

16. An environmental enclosure comprising:
a humidity-pressure input port, wherein the environmental enclosure is configured to receive humidity or pressure input from the humidity-pressure input port for changing the humidity or atmospheric pressure within the environmental enclosure;
a heating element including a see-through void that includes a hole in the heating element;
a mechanical stage configured to hold an eye-tracking optical element to receive heat from the heating element and configured to move the eye-tracking optical element with respect to the see-through void of the heating element; and
a detection window of the environmental enclosure, wherein the detection window is configured to allow reflection light reflecting off of an eye-tracking target to become incident on the eye-tracking optical element and configured to allow the eye-tracking optical element to redirect the reflection light to an eye-tracking camera to capture an eye-tracking image.

17. The environmental enclosure of claim 16, wherein the heating element includes a Peltier.

18. The environmental enclosure of claim 17, wherein the environmental enclosure is configured to receive temperature commands to adjust a temperature of the Peltier.

19. The environmental enclosure of claim 16, wherein the eye-tracking optical element is a near-eye eye-tracking optical element.

20. The environmental enclosure of claim 16, wherein the environmental enclosure is vacuumed-sealed.

* * * * *